(12) United States Patent  (10) Patent No.: US 7,454,009 B2
Aupperle et al.  (45) Date of Patent: Nov. 18, 2008

(54) RING-TONE IDENTIFICATION OF URGENT PHONE CALLS

(75) Inventors: Bryan Eric Aupperle, Cary, NC (US); James Merwin Mathewson, II, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 10/424,028

(22) Filed: Apr. 25, 2003

(65) Prior Publication Data

US 2004/0213401 A1  Oct. 28, 2004

(51) Int. Cl.
*H04M 1/00*  (2006.01)
(52) U.S. Cl. .............................. 379/373.02; 379/142.06
(58) Field of Classification Search .... 379/372–376.02, 379/142.01, 142.02, 142.03, 142.04, 142.05, 379/142.06, 142.14, 142.13, 93.12, 373.01, 379/373.02, 373.04, 373.05
See application file for complete search history.

(56) References Cited

U.S. PATENT DOCUMENTS

| | | | | |
|---|---|---|---|---|
| 4,791,664 | A | | 12/1988 | Lutz et al. .................... 379/199 |
| 5,220,599 | A | * | 6/1993 | Sasano et al. .......... 379/142.06 |
| 5,442,692 | A | * | 8/1995 | Yamazaki et al. ........... 379/253 |
| 5,604,791 | A | * | 2/1997 | Lee ......................... 379/88.21 |
| 5,661,788 | A | | 8/1997 | Chin .......................... 379/142 |
| 5,926,537 | A | * | 7/1999 | Birze ......................... 379/252 |
| 6,370,233 | B1 | | 4/2002 | Bennett, III et al. ........... 379/37 |
| 6,509,833 | B2 | | 1/2003 | Tate ........................... 340/539 |
| 6,611,583 | B1 | * | 8/2003 | Gainsboro ................... 379/188 |
| 6,650,746 | B1 | * | 11/2003 | Groen et al. ........... 379/207.16 |
| 6,724,870 | B1 | * | 4/2004 | Henderson et al. ....... 379/93.02 |
| 6,961,559 | B1 | * | 11/2005 | Chow et al. .............. 455/414.1 |
| 7,106,846 | B2 | * | 9/2006 | Nguyen et al. ......... 379/207.16 |
| 7,197,135 | B1 | * | 3/2007 | Silver et al. ............ 379/373.02 |
| 2001/0037355 | A1 | | 11/2001 | Britt, Jr. ...................... 709/201 |
| 2002/0054673 | A1 | | 5/2002 | Bennett, III et al. ..... 379/201.01 |
| 2002/0064268 | A1 | | 5/2002 | Pelletier et al. ............. 379/201 |
| 2002/0115456 | A1 | * | 8/2002 | Narinen et al. .............. 455/466 |
| 2003/0016813 | A1 | * | 1/2003 | Weiner ................... 379/373.02 |
| 2003/0188319 | A1 | * | 10/2003 | Weissman .................... 725/106 |
| 2003/0198322 | A1 | * | 10/2003 | White, Jr. ................ 379/88.19 |

(Continued)

FOREIGN PATENT DOCUMENTS

WO  WO 02/087209  10/2002

*Primary Examiner*—Olisa Anwah
(74) *Attorney, Agent, or Firm*—Jeanine Ray-Yarletts, Esq.; Steven M. Greenberg, Esq.; Carey Rodriguez Greenberg & Paul LLP

(57) ABSTRACT

A method for activating a distinctive ring-tone can include the steps of extracting caller identifying data from an incoming phone call; comparing the caller identifying data to data in a caller list; determining whether the caller is authorized to activate a distinctive ring-tone based upon the comparison; and, activating a distinctive ring-tone if the caller is authorized and if a request to activate a distinctive ring-tone can be detected in the incoming phone call. The extracting step can include the step of extracting a source phone number from the incoming phone call. The determining step can include the step of determining whether the caller has been included in the caller list as an authorized caller. Conversely, the determining step comprises the step of determining whether the caller has been included in the caller list as an unauthorized caller.

4 Claims, 4 Drawing Sheets

U.S. PATENT DOCUMENTS

2003/0202651 A1* 10/2003 Nguyen et al. ......... 379/373.02
2004/0058710 A1* 3/2004 Timmins et al. ............ 455/560
2004/0067751 A1* 4/2004 Vandermeijden et al. . 455/414.1
2004/0072593 A1* 4/2004 Robbins et al. ............. 455/560
2004/0177122 A1* 9/2004 Appelman et al. .......... 709/206

* cited by examiner

RING-TONE IDENTIFICATION OF URGENT PHONE CALLS

BACKGROUND OF THE INVENTION

1. Statement of the Technical Field

The present invention relates to the field of telecommunications, and more particularly to the selective activation of phone ring-tones.

2. Description of the Related Art

Caller identification techniques have become a necessary aspect of personal telecommunications management in consequence of the explosion of personal communications devices in the marketplace. Persons ranging from pre-adolescents through convalescents carry cellular telephones as readily as they carry wallets and purses. As a result of the mass distribution of personal communications devices, today anyone can be reached by telephone at any hour, regardless of the desirability of one to be "reached". In many ways, people have become overly accessible.

As a solution to having become overly accessible, it stands to reason that one simply can discard their cellular telephones, or at the minimum, choose not to answer incoming phone calls when it becomes inconvenient to do so. Still, most who carry cellular telephones remain acutely aware that enhanced reachability can prove important in the case of an emergency, or at least when a call has been deemed "urgent" or "important". To that end, it is known to provide distinctive ring-tones for selected individuals who originate phone calls from specified phone numbers. By identifying the caller by phone number and matching the identified phone number to a phone number pre-specified in a list of phone numbers, a distinct ring-tone can be audibly produced which differs from the ordinary ring-tone produced by the telephone handset. By recognizing the distinct ring-tone, the call recipient can know that the person who is calling is considered of higher priority than a typical caller.

Examples of distinctive ringing technology include that which has been disclosed in U.S. Pat. No. 5,661,788 for "Method and System for Selectively Alerting User and Answering Preferred Telephone Calls" and in PCT Application Publication No. WO 02/087209 entitled "Device for Selecting Ring Tones in Real Time According to the Caller's Number and Associated Methods and Systems." In both publications, distinctive ring tones are produced responsive to the matching of a caller's number to a phone number in a pre-specified list. In this way, the call recipient can infer a priority of the call based upon a pre-determination that any call having the distinctive ring-tone is a higher priority call than calls producing an ordinary ring-tone.

Notably, in an emergency circumstance, it is possible to alter the ring-tone of an incoming phone call in order to denote a sense of urgency. For example, in United States Patent Application Publication US 2002/0054673 A1 and in U.S. Pat. No. 6,370,233 B1, both entitled "Security System with Call Management Functionality", a home security system can screen incoming phone calls at night to enforce evening privacy. Where a caller indicates that a call is an emergency, despite a request by the home security system that the caller ought to leave a message, the home security system can permit the house telephone to ring with a distinctive ring tone to indicate that the phone call is an emergency. It will be recognized by the skilled artisan, however, that as described in the foregoing publications, the home security cannot prevent any person who calls the home security system from feigning an emergency to cause the phone call to ring through to the household.

SUMMARY OF THE INVENTION

The present invention is a ring-tone identification system and method. The ring-tone identification system and method overcomes the deficiencies of the prior art by affirmatively establishing at the selective discretion of the call recipient, those callers who can activate a distinctive ring-tone, and those who cannot activate a distinctive ring-tone. Callers who are deemed trustworthy can be permitted to activate a distinctive ring-tone on a discretionary basis. Conversely, callers who are deemed untrustworthy are not permitted to activate the distinctive ring-tone, regardless of discretion. In this way, the sense of urgency associated with a distinctive ring-tone will be less likely to be feigned by an unknown or untrusted caller.

To that end, a ring-tone identification system which has been suitably configured in accordance with the inventive arrangements can include a list of callers authorized to activate a distinctive ring-tone. The system further can include a ring-tone identification processor coupled to the list. The ring-tone identification system can be configured to activate a distinctive ring-tone responsive to detecting an incoming phone call from a caller in the list in which a distinctive ring-tone has been requested. Notably, in a preferred aspect of the invention, the list of callers can include a list of caller identifying data selected from the group consisting of a phone number, a name, and a passphrase. Furthermore, the distinctive ring-tone can include audio produced through processing a digital multimedia file. Finally, at least one list of unauthorized callers can be provided in which listed callers are prohibited from activating a distinctive ring-tone.

Notably, the invention is not merely limited to the bifurcation of all potential callers into authorized and unauthorized callers. Rather, in an alternative aspect of the invention, multiple tiers of trustworthiness can be established corresponding to a different range of available distinctive ring-tones. In this regard, at least one additional list of callers can be included in which individual callers can be listed, each having a level of authorization which varies both from an ordinary caller and a caller listed in the list of callers authorized to activate a distinctive ring-tone. Consequently, the ring-tone identification processor can be further configured to activate another distinctive ring-tone for calls received from callers in the additional list of callers responsive to detecting an incoming phone call from a caller in the additional list in which a distinctive ring-tone has been requested.

A method for activating a distinctive ring-tone can include the steps of extracting caller identifying data from an incoming phone call; comparing the caller identifying data to data in a caller list; determining whether the caller is authorized to activate a distinctive ring-tone based upon the comparison; and, activating a distinctive ring-tone if the caller is authorized and if a request to activate a distinctive ring-tone can be detected in the incoming phone call. The extracting step can include the step of extracting a source phone number from the incoming phone call. The determining step can include the step of determining whether the caller has been included in the caller list as an authorized caller. Conversely, the determining step comprises the step of determining whether the caller has been included in the caller list as an unauthorized caller.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a ring-tone identification system and method able to selectively permit callers to activate a distinct audio or visual alert feature (collectively, "ring-tone") for calls deemed urgent by the caller. More particularly, a call recipient can establish a list of callers authorized to invoke an urgent ring-tone when announcing a phone call to the call recipient. Subsequently, when an authorized caller determines that a phone call is urgent in nature, a code can be appended to the caller's identifying data. For a phone call received from an authorized caller in a call recipient node, the call recipient node can detect the code and, once validating the authorized nature of the caller, the call recipient can produce an audibly or visually distinct ring-tone which can be recognized as an urgent call by the call recipient.

Figure 1:
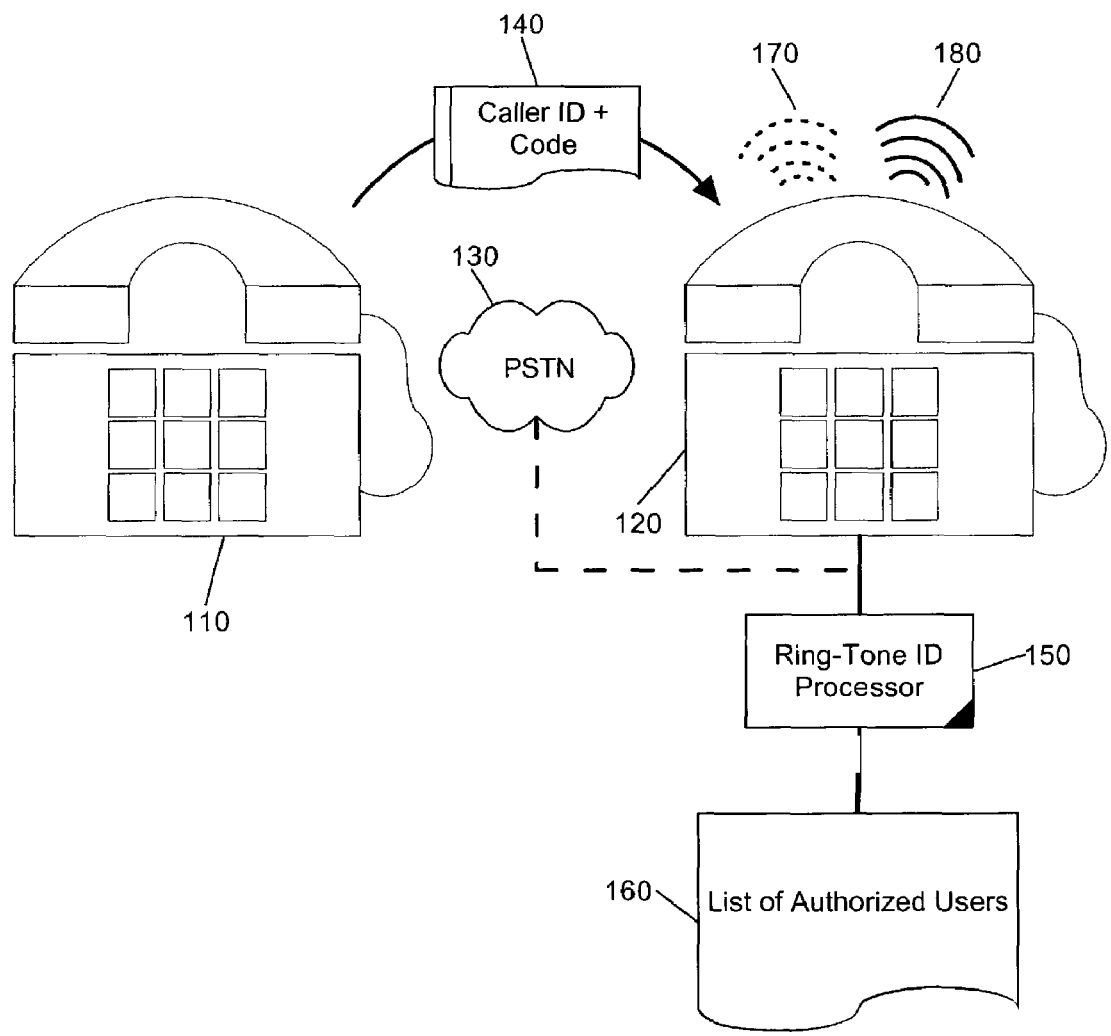
FIG. 1 is a schematic illustration of the ring-tone identification system and method of the present invention.

FIG. 1 is a schematic illustration of the ring-tone identification system and method of the present invention. The ring-tone identification system can include a calling node 110 and a called node 120 which can be communicatively coupled at the direction of the calling node 110 over the public switched telephone network (PSTN) 130. The called node 120 can include both a ring-tone identification processor 150, and a list of authorized callers 160. The calling node 120 further can be configured to emit at least two distinct ring-tones 170, 180, for instance basic ring-tones which can vary from one other in duration and pitch, or more complex ring-tones which take the form of digitized music.

The list of authorized callers 160 can include a list of those callers deemed able to selectively activate an urgent ring-tone. To that end, the list of authorized callers 160 can include any identifying aspect of the caller, including a calling node phone number, a caller name associated with the calling node phone number, a passphrase, or other such identifying data. The ring-tone identification processor 150 can be coupled to the list of authorized callers 160 and can compare identifying data 140 associated with an incoming phone call to data in the list of authorized users 160. Based upon a match between the identifying data 140 and data in the list of authorized users 160, the calling node can be permitted to activate a distinct one of the ring-tones 170, 180 based upon whether the calling node has so requested such activation.

It will be recognized by the skilled artisan that the invention is not so limited in the manner as described herein and can include variations therefrom which do not depart from the spirt of the present invention. In this regard, in a less restrictive configuration, the list of authorized callers 160 can act as a list of unauthorized callers in which enumerated callers are not permitted to activate a distinct one of the ring-tones 170, 180. Additionally, in a more robust configuration multiple distinct ring-tones can be activated according to a set of activating codes which extend beyond a mere urgent/not urgent paradigm. Finally, the list of authorized callers 160 can include multiple tiers of authorized callers in which additional distinct ring-tones can be selected by callers listed at higher levels of a permissive hierarchy.

Importantly, in a preferred aspect of the invention, the ring-tone identification processor 150 can be coupled not directly to the called party 120, but to infrastructure included in the PSTN 130. In this regard, the ring-tone identification system of FIG. 1 can be distributed commercially to end-users as a service to the end-user. Moreover, the ring-tone identification system of FIG. 1 can be deployed to limited function and "dumb" handsets which lack the processing capability to internally process requests to produce an audibly or visually distinct ring-tone. Finally, by deploying the ring-tone identification processor 150 in the PSTN 130, the system can be scaled to include a vast number of called parties 120.

Figure 2:
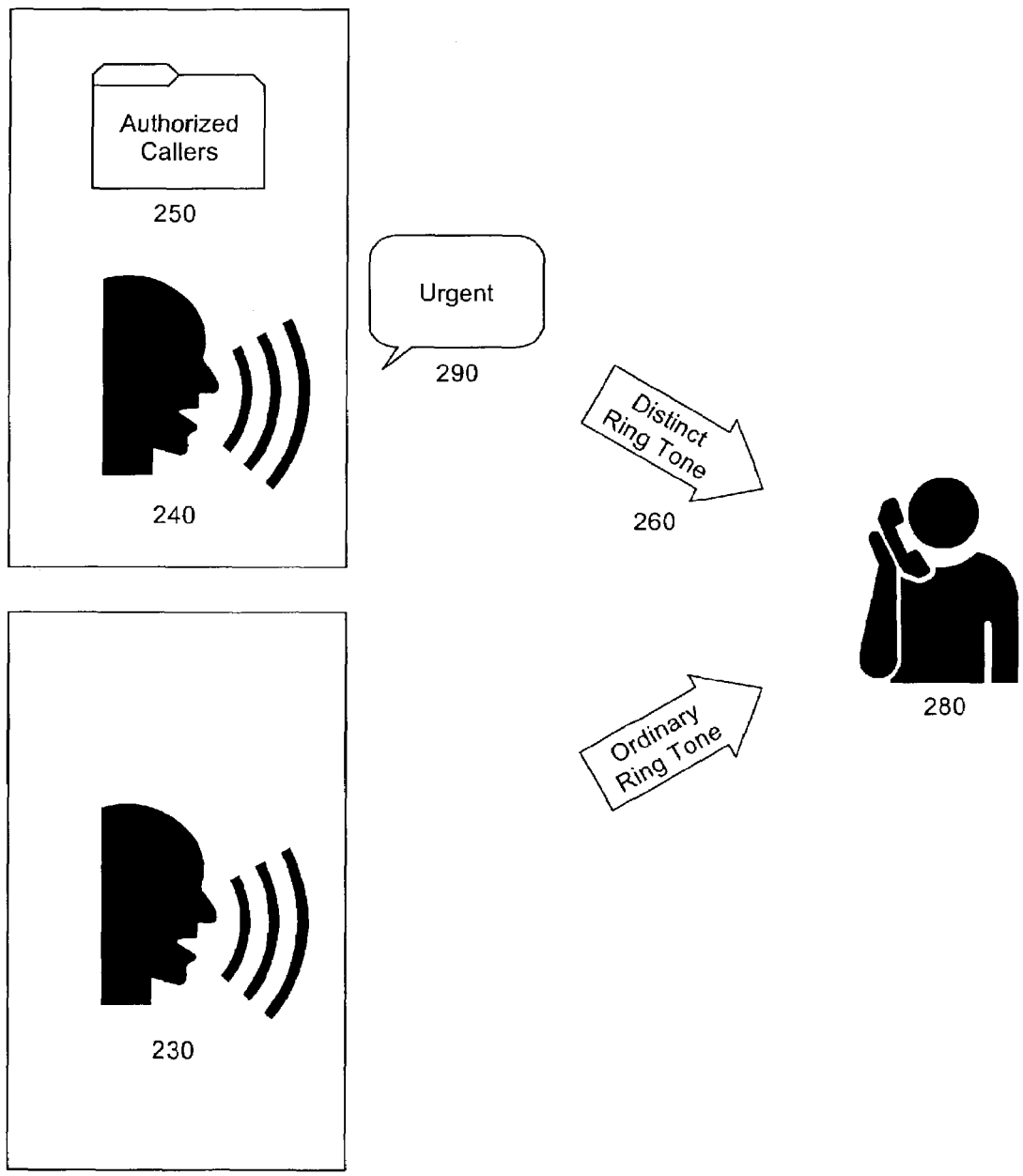
FIG. 2 is a pictorial illustration of the ring-tone identification system of FIG. 1.

FIG. 2 is a pictorial illustration of the ring-tone identification system of FIG. 1. As it will be apparent to one skilled in the art, in the present invention, the set of all possible callers can be divided into at least two sets of callers: authorized callers 240 whose identity has been included in a list of authorized callers 250, and all other callers 230 unspecified by the call recipient 280. As before, it should be noted that the set of all possible callers can be divided equally as well amongst those callers who explicitly are not authorized, and all other callers who are deemed implicitly authorized.

In any case, it will be recognized that the sub-division of the set of all possible callers represents an affirmative decision on the part of the call recipient 280 as to who is trustworthy enough to exercise the activation of a distinct ring-tone 260 in response to an urgent condition 290, and who is not trustworthy enough to exercise such discretion. Furthermore, it is contemplated that "levels" of trustworthiness" can be established as to the range and selection of distinct ring-tones available for use by a caller. Thus, unlike conventional ring-tone identification systems, in accordance with the present invention, a call recipient can limit the availability or unavailability of distinct ring-tone activation to a select group of callers.

Additionally, it will be recognized that in the present invention, a distinctive ring-tone is not limited to those audibly distinct alerts which can be produced via transducive element. Rather, in the present invention, a distinctive ring-tone can include a visually or tactilely distinct alert feature. By way of example, a visually distinctive alert feature can include differing video imagery, flashing or pulsating lights, and the like. As a further example, a tactilely distinct alert feature can include differing vibration patterns commonly encountered in commercial paging and cell phone handsets.

Figure 3:
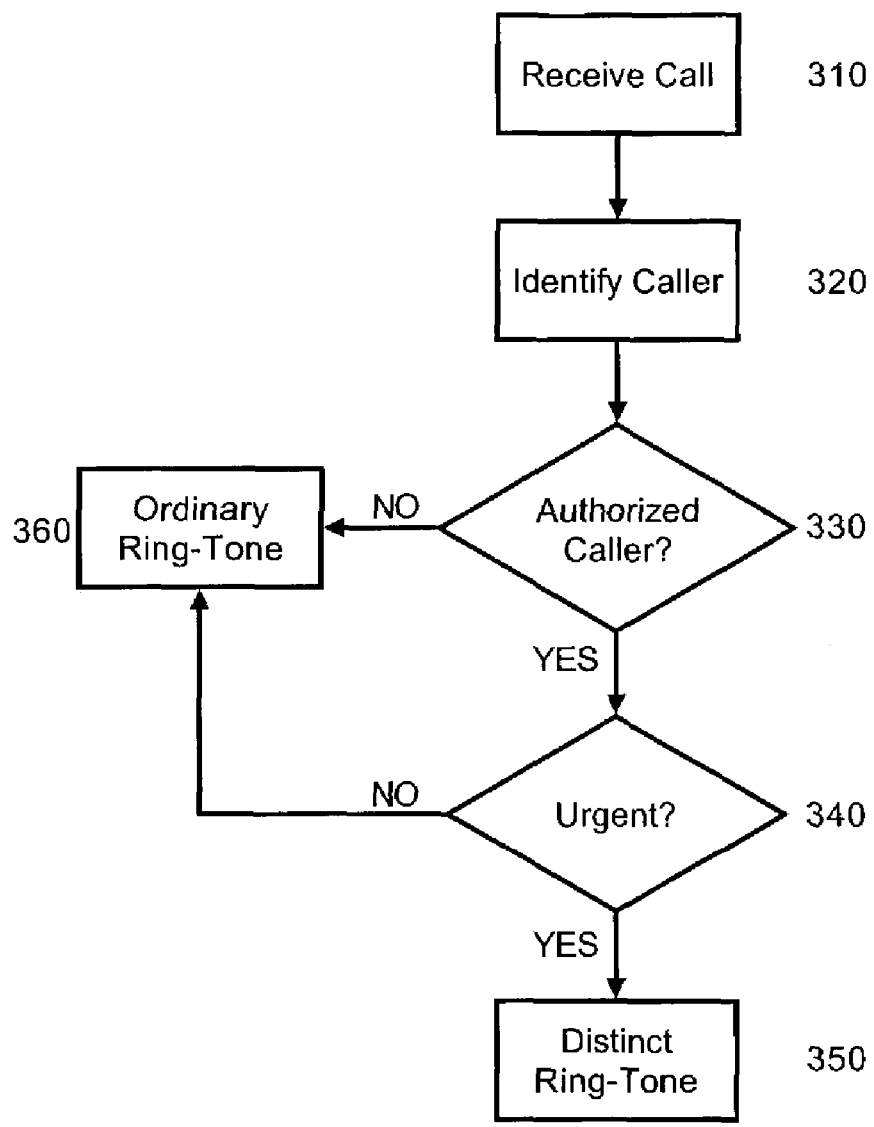
FIG. 3 is a flow chart illustrating a process for selectively producing an audibly distinct ring-tone in the ring-tone identification system of FIG. 1; and, FIG. 4 is a flow chart illustrating an alternative process for selectively producing an audibly distinct ring-tone in the ring-tone identification system of FIG. 1.

FIG. 3 is a flow chart illustrating a process for selectively producing an audibly distinct ring-tone in the ring-tone identification system of FIG. 1. Beginning in block 310, a call recipient node can receive a call from a calling node. In block 320, the caller can be identified through data provided by the calling node to the call recipient node. In decision block 330, the data can be compared to a list of authorized callers to determine whether the caller is authorized to activate a distinct ring-tone at the discretion of the caller. If not, the call recipient node can activate an ordinary ring-tone in block 360.

Otherwise, where the caller has been determined to be authorized to exercise discretion in activating a distinct ring-tone, in decision block 340 it can be determined whether the caller has in fact exercised such discretion. If not, as before, in block 360 an ordinary ring-tone can be audibly produced to alert the called party of an incoming phone call. If, however, in decision block 340 it is determined that the caller has in fact exercised such discretion to activate a distinct ring-tone, in block 350 a distinct ring-tone can be audibly produced to alert the called party of an urgent incoming phone call.

Figure 4:
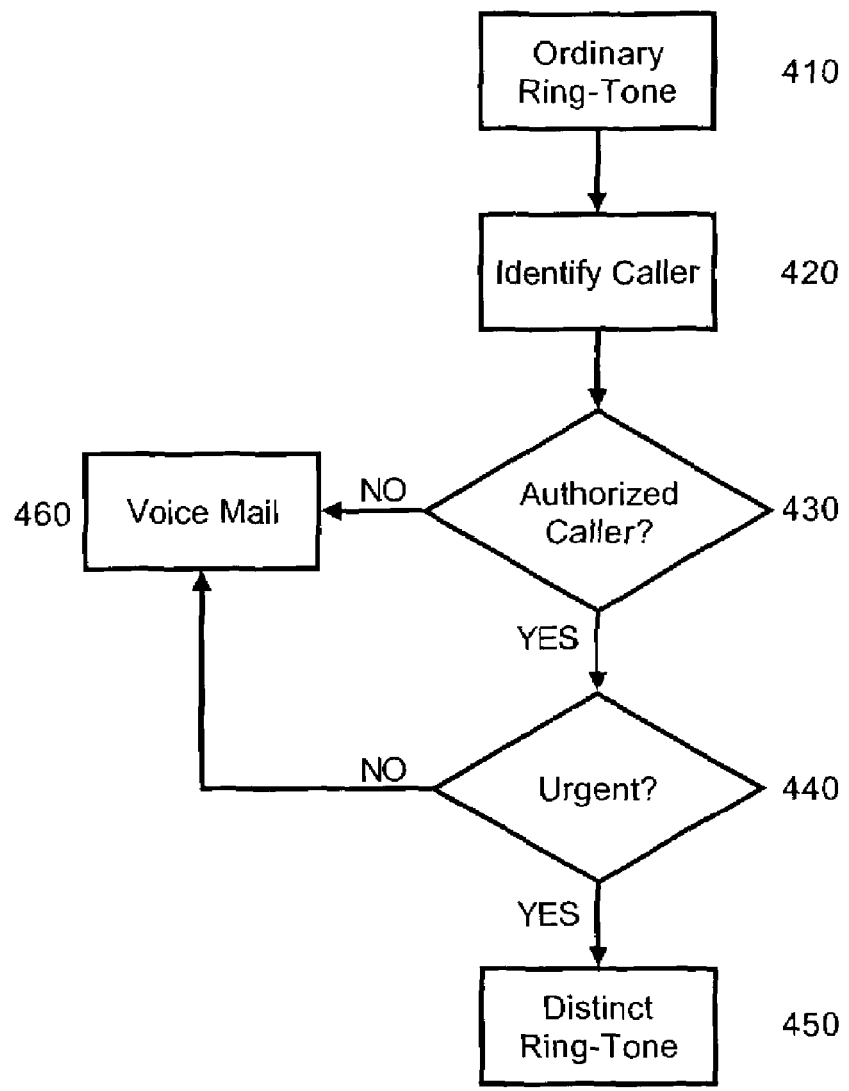

FIG. 4 is a flow chart illustrating an alternative process for selectively producing an audibly distinct ring-tone in the ring-tone identification system of FIG. 1. Beginning in block 410, a call recipient node can receive a call from a calling node and an ordinary ring-tone can be produced. In block 420, the caller can be identified through data provided by the calling node to the call recipient node. In decision block 430, the data can be compared to a list of authorized callers to determine whether the caller is authorized to activate a distinct ring-tone at the discretion of the caller. If not, the call recipient node can route the yet unanswered phone call to voice mail in block 460.

Otherwise, where the caller has been determined to be authorized to exercise discretion in activating a distinct ring-tone, in decision block 440 it can be determined whether the caller has in fact exercised such discretion. If not, as before, in block 460 the yet unanswered phone call can be routed to voice mail. If, however, in decision block 440 it is determined that the caller has in fact exercised such discretion to activate a distinct ring-tone, in block 450 a distinct ring-tone can be audibly produced to alert the called party of an urgent incoming phone call.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for activating a distinctive ring-tone comprising the steps of:

extracting caller identifying data from an incoming phone call to a call recipient;

comparing said caller identifying data to data in a caller list;

determining whether said caller is authorized by the call recipient to activate a distinctive ring-tone based upon said comparison;

activating a distinctive ring-tone if said caller is authorized and if a request to activate a distinctive ring-tone by the caller can be detected in said incoming phone call;

activating a different ring tone if said caller is not authorized or if said request to activate a distinctive ring-tone by the caller cannot be detected in said incoming phone call, and activating another distinctive ring-tone for calls received from callers in an additional list of callers responsive to detecting an incoming phone call from a caller in said additional list in which a distinctive ring-tone has been requested, wherein said additional list of callers comprising individual callers each having a level of authorization which varies both from an ordinary caller and a caller listed in said list of callers authorized to activate a distinctive ring-tone.

2. The method of claim 1, wherein said extracting step comprises the step of extracting a source phone number from said incoming phone call.

3. The method of claim 1, wherein said determining step comprises the step of determining whether said caller has been included in said caller list as an authorized caller.

4. The method of claim 1, wherein said determining step comprises the step of determining whether said caller has been included in said caller list as an unauthorized caller.

* * * * *